Dec. 29, 1925.

W. A. MINOR 1,567,448

HYDROPNEUMATIC PUMPING SYSTEM

Filed Feb. 14, 1925    3 Sheets-Sheet 1

INVENTOR.
William A. Minor

BY
*his* ATTORNEYS.

Dec. 29, 1925.
W. A. MINOR
1,567,448
HYDROPNEUMATIC PUMPING SYSTEM
Filed Feb. 14, 1925    3 Sheets-Sheet 2
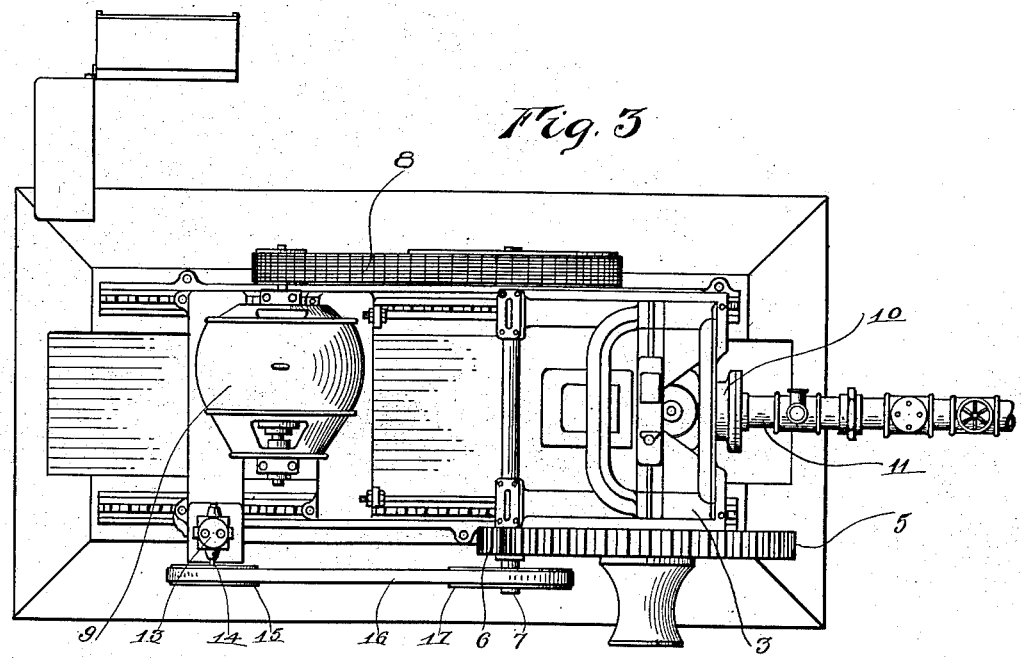
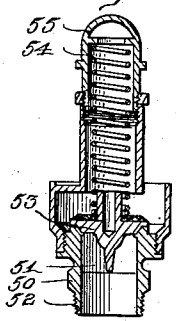
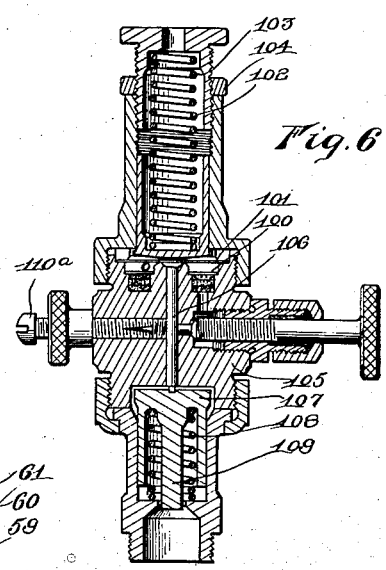
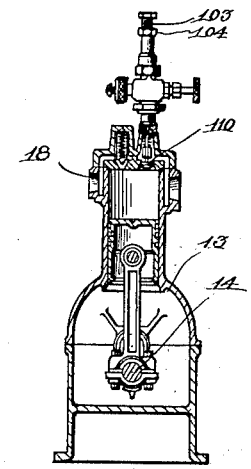
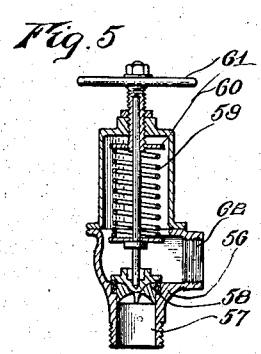
INVENTOR.
William A. Minor
BY
his ATTORNEYS.

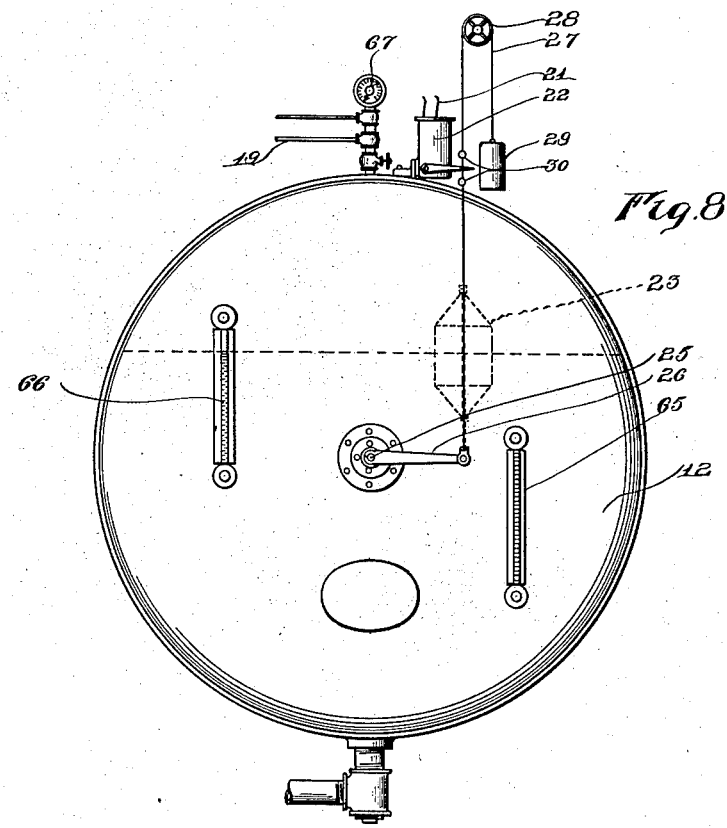
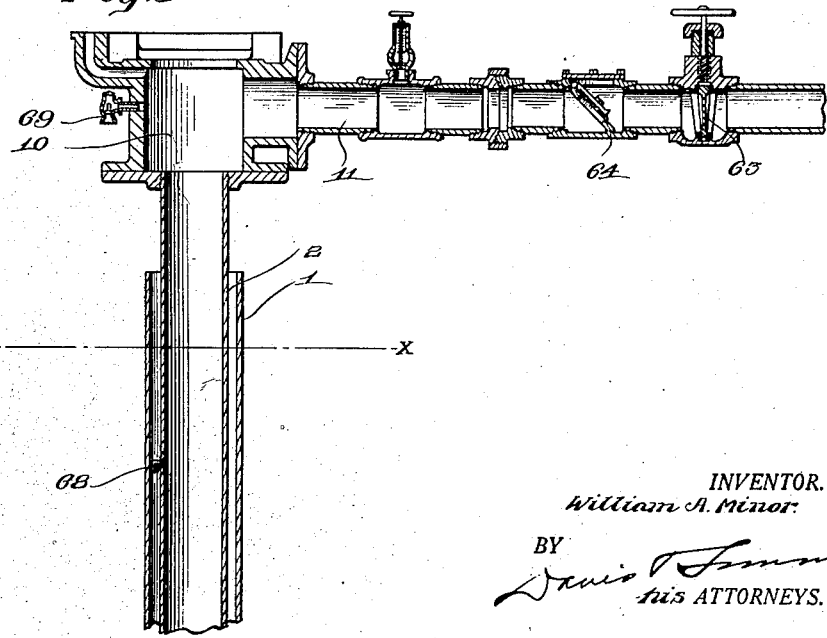
INVENTOR.
William A. Minor.
BY
his ATTORNEYS.

Patented Dec. 29, 1925.

1,567,448

UNITED STATES PATENT OFFICE.

WILLIAM A. MINOR, OF ROCHESTER, NEW YORK, ASSIGNOR TO LUITWEILER PUMPING ENGINE COMPANY, OF ROCHESTER, NEW YORK, A CORPORATION OF NEW YORK.

HYDROPNEUMATIC PUMPING SYSTEM.

Application filed February 14, 1925. Serial No. 9,113.

*To all whom it may concern:*

Be it known that I, WILLIAM A. MINOR, a citizen of the United States, and resident of Rochester, in the county of Monroe and State of New York, have invented certain new and useful Improvements in Hydropneumatic Pumping Systems, of which the following is a specification.

The present invention relates to hydropneumatic pumping systems. An object of the invention is to provide a system where both air and water are pumped into a closed tank under pressure, and both the air and the water are under complete automatic control at all times, for both volume and pressure. Another object of the invention is to provide a reliable method of supplying, with one mechanism, deep well water under pressure from a tank that may be buried under ground or in any other convenient place and which will insure water regulation for capacity and pressure. A further object of the invention is to relieve the starting load from a power plant by an automatic device which will allow much heavier pressures to be used than at present possible.

To these and other ends, the invention consists of certain parts and combinations of parts, all of which will be hereinafter described, the novel features being pointed out in the appended claims.

In the drawings:

Fig. 3 is an enlarged plan view of the pump and the parts in immediate proximity thereto;

Fig. 4 is a sectional view through the air relief;

Fig. 5 is a sectional view through the water relief valve;

Fig. 6 is a sectional view through the unloader valve of the air compressor;

Fig. 7 is a vertical section through the air compressor;

Fig. 8 is an enlarged view of one end of the storage tank; and

Fig. 9 is a sectional view of the upper end of the well and its connection with the main.

Figure 1:
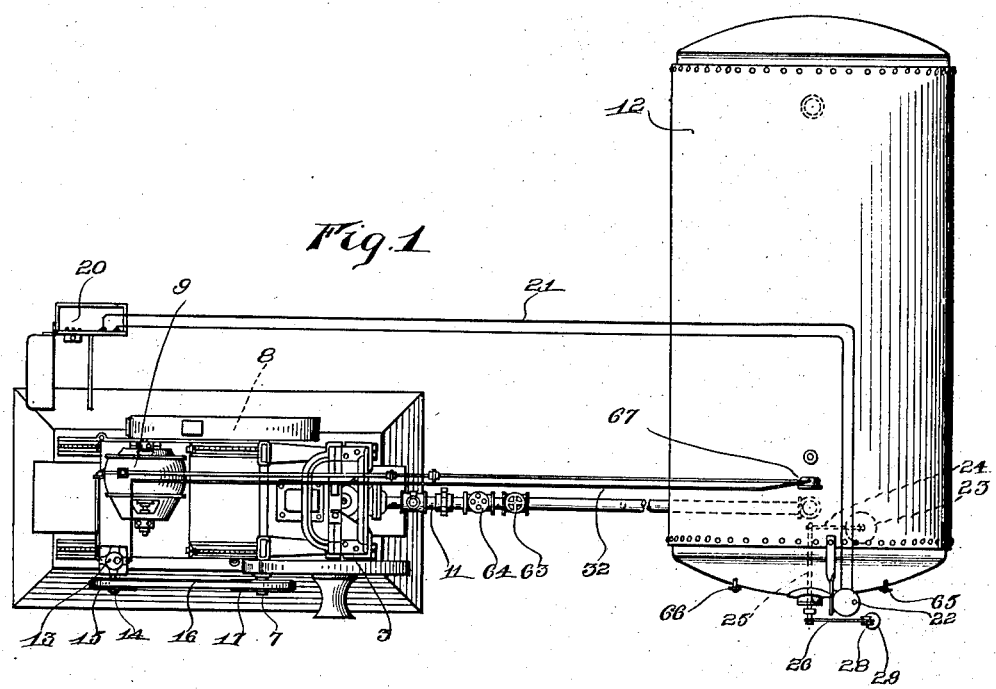
Fig. 1 is a plan view of a system constructed in accordance with this invention.
Figure 2:
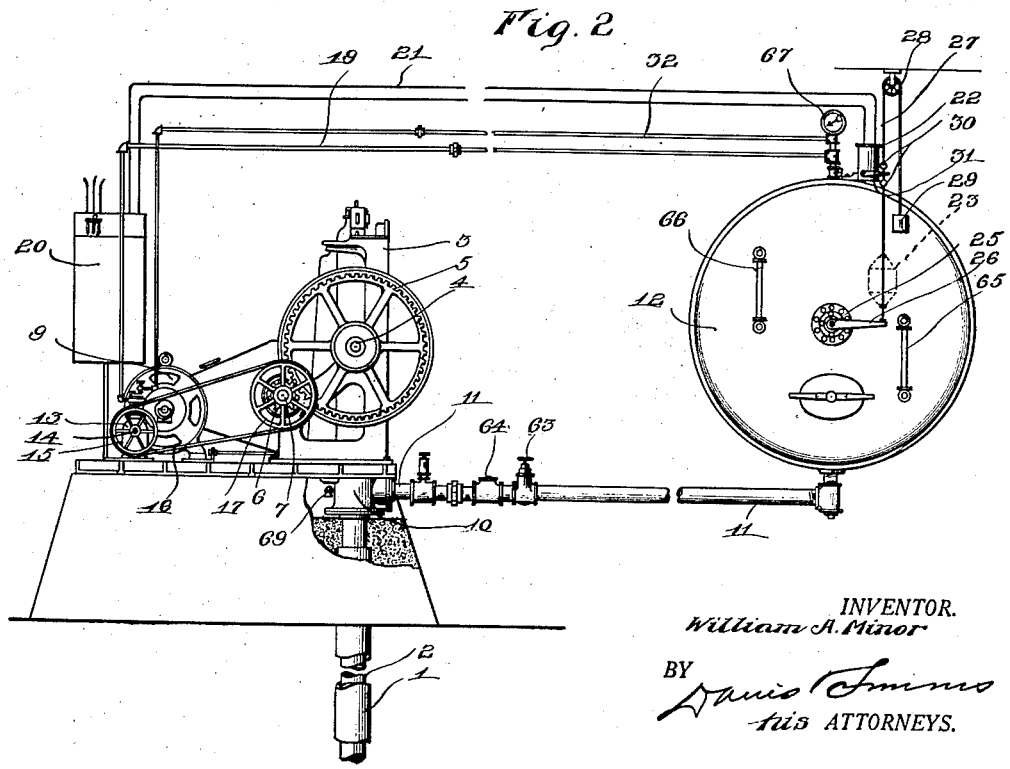
Fig. 2 shows a system in elevation, parts being broken away.

Two types of pumping systems are now in most general use, one embodying an overhead tank receiving water from the pump and using the force of gravity for discharging water from such tank, and the second consisting of a hydro-pneumatic pressure tank receiving water from a pump operated by pressure control and discharging the water under the pressure in the tank. The first of these systems embodying the overhead tank is objectionable because of its inaccessibility, the difficulty in keeping the water clean and sanitary, the danger of freezing in winter and becoming hot in summer, the inability to regulate pressure or furnish additional pressure for emergency use, such as fire service, the unsightliness of the elevated tank and superstructure and the amount of ground space occupied.

The second type of system has been objectionable because the pressure tank system has not had absolute automatic control of both the volume and pressure, and, as a consequence, as the volume of water decreases from use, the air pump is commonly used, controlled from pressure, will supply an additional volume of air, replacing the water and, in many instances, filling the discharge lines from the tank with air instead of water. Another disadvantage of this hydropneumatic tank system, as hereinbefore employed, is that the amount of air in the tank may be gradually absorbed by the water and the tank become filled with water instead of part air and part water, the non-elasticity of the water causing the pump to start and stop with every withdrawal of water from the tank no matter how small an amount, thus imposing severe extra duty on the mechanism due to the fact that the water is solid and practically non-compressible. The systems employing hydro-pneumatic pressure tanks now in use are of two types, one with hand control of the air pump, making it non-automatic, and the other with a separate set of pressure control automatics, regulating a separate air compressor installation with separate power and transmission, this latter type being further objectionable due to the two sets of pressure controls which will not work in harmony with each other automatically.

According to this invention a hydropneumatic pumping system is employed where both air and water are pumped into a closed tank under pressure and both the air and water are under complete automatic control at all times for both volume and pressure. The volume of water for continuous use is limited only by the capacity of the well, or by the size of the pumping plant installed; and for intermittent service the volume of the water is equal to the capacity of the well or pump, plus the amount of water under storage in the tank; the pressure being uniform within the limits of the controlling device, usually varying but a few pounds.

In the illustrated embodiment of the invention, 1 indicates the outer casing of the well and 2 the cylinder in which the usual double or oppositely acting pistons operate, these being controlled by a pumping mechanism of any suitable construction mounted on the head frame 3. On the drive shaft 4 of this pumping mechanism, a gear 5 is mounted which meshes with the gear 6 on a shaft 7 which through a chain 8 is driven, in this instance, from an electrical motor or other power device 9. From the discharge chamber 10 at the outer end of the cylinder 2, an outlet pipe 11 leads to a storage tank 12 which may if desired be placed in the ground where it will not be subjected to freezing or insanitary conditions.

In order to supply air to this tank 12 above the water therein, an air compressor 13 is provided, one form of air compressor being illustrated in Fig. 7. The shaft 14 of this air compressor has a pulley 15 thereon which by a belt 16 connects with the pulley 17 on the shaft 7, so that when the pump is driven to supply water to the storage tank 12, the air compressor will also be operated to supply air to such tank, the outlet 18 of the compressor 13 being by a pipe 19 connected to the tank or system.

Any suitable automatic means operated by the liquid level in the tank may be employed for controlling the power element or electric motor 9. In the illustrated embodiment an electric controller 20 of known construction is through conductors 21 connected to a switch 22 situated in immediate proximity to the storage tank 12. This switch is closed whenever the water level in the tank recedes below a desired minimum to effect the starting of the electric motor and the operation of the pump, and is opened whenever the water level in the tank shall have reached the desired maximum to effect the stoppage of the motor.

In the illustrated embodiment of the invention, the control of this switch 22 is effected by a float 23 arranged within the tank and connected to an arm 24 on a rock shaft 25 which extends through one of the heads or ends of the tank 12 to the exterior of such tank where it is provided with an arm 26. This arm 26 has a cable 27 connected thereto and passed upwardly about the pulley 28 and downwardly to a weight 29 which acts as a counterbalance for the arms of the float 23. This cable 27 has two spaced projections 30 thereon which lie on opposite sides of an arm 31 of the switch 22. The movement of the float 23 upwardly shifts the switch to cut off the current to the electric motor 9, whereas the movement of the float downwardly closes the switch to start the motor 9.

Automatic control of the air pressure in the tank is obtained by providing the air compressor with an unloader one form of which is illustrated in Fig. 6 in the drawings. This unloader is mounted on the cylinder of the air compressor and when the air pressure in the tank 12 has reached a certain amount, the suction valve of the air compressor is opened so that the air compressor does not act. This is effected, in this instance, by providing a piping 32 leading from the top of the tank to the unloader. The piping 32 leads to the chamber 100 in the unloader as illustrated in Fig. 6 below the diaphragm 101. This pressure is counteracted by means of a spring 102, the tension of which can be adjusted by a regulating cap 103 after releasing a lock nut 104. When the pressure in the diaphragm becomes greater than that of the spring, the diaphragm is lifted from the seat and the air enters the body 105 through the port 106 acting on the piston 107, whose movement is opposed by a spring 108 and which has an operating projection 109 acting directly on the inlet valve 110 of the air compressor thus holding the suction valve off the seat, unloading the compressor as no air can be compressed and will thus pass off into the open valve and into the atmosphere. When the pressure is not sufficient to overcome the spring 102 the diaphragm again returns to its seat over the upper end of the port or passageway 106 and the air in the cylinder 17 escapes through the leak screw 110$^a$ allowing the piston to return to its normal position so that the suction valve again becomes operative. This form of unloader is not novel and no claim is made of the same per se.

A provision may be made for relieving the air pressure above the water as the latter rises in the tank and with this end in view an air relief valve, such as shown in Fig. 4, may be employed. This air relief valve has a casing 50 formed with an outlet air passage 51 and with screw threads 52 adapting it for attachment to the storage tank 12. The upper end of this passage is closed by a valve 53 which is held to its seat by a spring 54, the latter having an adjustable abutment 55 through which the tension on the spring may be varied so that this valve will operate at a desired pressure to relieve the air pressure within the storage tank.

It is also desirable to provide a relief valve for the water from the pump to the tank, this relief valve, in this instance, being illustrated in Fig. 5 and comprising a casing member 56 having a portion 57 adapted for screw threaded engagment with the outlet pipe 11. In this casing a valve 58 is arranged being held to its seat by a spring 59 which has an adjustable abutment 60 controlled by a wheel 61 so that when the pressure in the supply pipe between the pump and the storage tank reaches a certain maximum, this valve 58 will open and discharge the water through the port 62.

The pump outlet pipe 11 may also be provided with a manually operated cut off valve 63 and also with a check valve 64 which will prevent the water from the storage tank flowing back into the pump or well. The storage tank may have two gage tubes 65 and 66 connected thereto, one being extended slightly above and below the normal water level and the other being slightly below the normal water level. In this way the interior condition of the tank may be readily ascertained. An air pressure gage 67 may be connected to the top of the tank to ascertain the pressure of the air in the tank.

With the end in view of preventing the freezing of the pump, the cylinder casing 2 may have a small bleed hole 68 which discharges into the well casing 1 below the frost line indicated at X. Between this bleed hole and the check valve 64 an air inlet valve 69 may be arranged. It is apparent that with this arrangement the bleed hole 68 will drain all the water from the pump above the bleed hole and up to the check valve 64, air passing into the pump to fill this space through the air valve 69.

From the foregoing it will be seen that there has been provided a hydro-pneumatic pumping apparatus where both air and water are pumped into a closed tank or system under pressure and both air and water are under complete control at all times for both volume and pressure. The volume of water for continuous use is limited only by the capacity of the well or by the size of the pumping plant, and for intermittent service the volume of the water is limited only by the capacity of the well or pump, plus the amount of water under storage in the tank or system, pressure being uniform within the limits of the controlling device and varying but slightly. There has also been provided a reliable method of supplying with one mechanism deep well water under pressure from a tank or system that may be buried under ground or located in any other convenient place and which will insure positive water regulation for capacity and pressure. The starting load on the power plant is relieved by an automatic device which allows starting under heavier pressures than at present. This relief provides space for a small amount of water to be pumped at atmospheric pressure after the pump is started, the space being only large enough to consume a capacity of one or two revolutions of the pump. An air compressor and a water pump are driven by the same power element and both pump into a closed pressure tank. Both are automatically started and stopped from a water level controlled switch which controls the power element. An unloading device is provided for the compressor which regulates the amount of air pumped within set limits in order to maintain the predetermined pressure in the tank. The system is provided with an air relief or safety valve which functions if necessary when the tank is being refilled with water to its normal level. The relief valve in the water discharge line from the pump to the tank protects the pump against unforeseen conditions.

What I claim as my invention and desire to secure by Letters Patent is:

1. A pumping system comprising a closed tank, a water pump for supplying water to the tank, an air compressor for supplying air to the tank and normally open to the tank, automatic means for automatically cutting off the supply of air when a certain pressure is reached in the tank, a common power element for driving both the water pump and the air compressor, and automatic means controlled by the level of the liquid in the tank for controlling said power element.

2. A pumping system comprising a closed tank, a water pump for supplying water to the tank, an air compressor for supplying air to the tank, a common power element for driving both the water pump and air compressor, and an unloading device for the air compressor controlled by the pressure in the tank.

3. A pumping system comprising a closed tank, a water pump for supplying water to the tank, an air compressor for supplying air to the tank, a common power element for driving both the water pump and air compressor, and a relief valve in the line between the air compressor and the tank relieving air pressure in the tank while the tank is being filled with water to its normal level after the water has been drawn below this level and the tank furnished with additional air to maintain the pressure during its withdrawal.

4. A pumping system comprising a closed tank, a water pump for supplying water to the tank, an air compressor for supplying air to the tank, a common power element for driving both the water pump and air compressor, and a relief valve in the water discharge line from the pump to the plant to prevent accidents to the system.

5. The combination with a pump and an outlet pipe, of a check valve in the outlet pipe, and means for draining the system between the check valve and a certain level in the pump to provide a space for a small amount of water to be pumped at atmospheric pressure when the pump is started.

6. A pumping system comprising a closed tank, a water pump for supplying water to the tank, an air compressor for supplying air to the tank, a common power element for driving both the water pump and air compressor, an unloading device for the air compressor which regulates the amount of air pumped in order to maintain a predetermined pressure in the tank, an air valve in the system and a relief valve in the water discharge line from the pump to the tank.

7. The combination with a pump and an outlet pipe, of a check valve in the outlet pipe, and means for draining the system between the check valve and a certain level in the pump to provide a space for a small amount of water to be pumped at atmospheric pressure when the pump is started, comprising an inlet valve between the pump and the check valve and means for draining the pump between the check valve and a certain point in the pump below the air inlet valve.

WILLIAM A. MINOR.